(12) United States Patent
Lee et al.

(10) Patent No.: US 6,944,870 B2
(45) Date of Patent: Sep. 13, 2005

(54) DISC DETECTION APPARATUS FOR SLOT-IN OPTICAL DISC DRIVE

(75) Inventors: In-Shuen Lee, Taipei (TW); Cheng-Fu Lee, Taipei (TW)

(73) Assignee: Lite-On It Corporation, Taipei (TW)

( * ) Notice: Subject to any disclaimer, the term of this patent is extended or adjusted under 35 U.S.C. 154(b) by 210 days.

(21) Appl. No.: 10/392,001

(22) Filed: Mar. 18, 2003

(65) Prior Publication Data

US 2003/0218959 A1 Nov. 27, 2003

(30) Foreign Application Priority Data

May 24, 2002 (TW) ...................................... 91207586 U

(51) Int. Cl.⁷ ............................................... G11B 17/04
(52) U.S. Cl. ...................................................... 720/645
(58) Field of Search ................................ 720/645, 621, 720/620, 606, 624; 369/77.11, 77.21, 178.01

(56) References Cited

U.S. PATENT DOCUMENTS

| | | | | |
|---|---|---|---|---|
| 4,539,670 A | * | 9/1985 | Inaba et al. ................. | 720/620 |
| 5,038,337 A | * | 8/1991 | Muramatsu et al. ........ | 720/645 |
| 5,119,354 A | * | 6/1992 | Umesaki ..................... | 369/30.9 |
| 5,150,349 A | * | 9/1992 | Takai et al. ................. | 720/626 |
| 5,828,641 A | * | 10/1998 | Abe et al. ................... | 720/645 |
| 6,373,795 B2 | * | 4/2002 | Takemasa et al. ........ | 369/30.85 |
| 6,438,093 B1 | * | 8/2002 | Yoshida et al. ......... | 369/178.01 |
| 6,449,230 B1 | * | 9/2002 | Seto ......................... | 369/53.19 |
| 6,480,442 B1 | * | 11/2002 | Nakatani et al. ......... | 369/30.36 |
| 6,587,412 B1 | * | 7/2003 | Matsuo et al. ........... | 369/53.12 |
| 2003/0210618 A1 | * | 11/2003 | Kimikawa et al. ....... | 369/30.36 |

* cited by examiner

Primary Examiner—Allen Cao
(74) Attorney, Agent, or Firm—Thomas, Kayden, Horstemeyer & Risley

(57) ABSTRACT

A disc detection apparatus for a slot-in optical disc drive. The apparatus includes a body, a light emitting device, a rolling unit, and a light receiving device. The light emitting device is disposed on the body, as is the rolling unit. The light receiving device is disposed on the rolling unit, wherein the light receiving device and the rolling unit are integral, conserving considerable deployment space.

11 Claims, 6 Drawing Sheets

DISC DETECTION APPARATUS FOR SLOT-IN OPTICAL DISC DRIVE

BACKGROUND OF THE INVENTION

1. Field of the Invention

The invention relates to a disc detection apparatus for a slot-in optical disc drive, and more particularly to a disc detection apparatus integrating a light sensor and a rolling unit.

2. Description of the Related Art

Conventional optical disc drives are generally classified sliding tray and slot-in types. Light sensor devices detect presence of a disc in a slot-in optical disc drive, and a roller unit operates to draw the disc into the drive.

Referring to FIG. 1, a conventional optical disc drive has a lower housing 1 to contain a body 2, a rolling unit 3 and a main circuit board 11. The body 2 and the rolling unit 3 are assembled so that the rolling unit 3 is always taken out along with the body 2 when the user detaches the body 2 from the optical disc drive.

A slot 4 is formed between the body 2 and the rolling unit for receiving and ejecting discs. A first circuit board 21 is disposed on the body 2, and a second circuit board 12 is disposed on the lower housing 1 corresponding to the first circuit board 21 so that the rolling unit 3 operates when a disc enters the slot 4. A light emitting device 211 and a light receiving device 121 are mounted on the first circuit board 21 and the second circuit board 12 respectively. When light is emitted from the light emitting device 211 and received by the light receiving device 121, the light receiving device 121 outputs a signal indicating that there is no disc between the light emitting device 211 and the light receiving device 121. When light is emitted from the light emitting device 211 but not received by the light receiving device 121, the light receiving device 121 outputs another signal indicating that light is obstructed by a disc. The presence of the disc is confirmed, such that startup and rotation of the rolling unit 3 are initialized.

It is noted that the light emitting device 211 and the light receiving device 121 are separately arranged. Such an arrangement requires two independent circuit boards 21, 12 for the light emitting device 211 and the light receiving device 121. It is disadvantageous to the arrangement of space in the optical disc drive. Furthermore, the second circuit board 12 and the light receiving device 121 are not integrated with the body 2. As a result, the second circuit board 12 is left in the lowing housing 1 with electric wires and signal lines connected to the body 2, while the body 2 is detached from the optical disc drive. That is inconvenient for the user to maintain the optical disc drive.

SUMMARY OF THE INVENTION

Accordingly, an object of the present invention is to provide a disc detection apparatus for a slot-in optical disc drive. The disc detection apparatus includes a body, a light emitting device, a rolling unit and a light receiving device. The light emitting device is disposed on the body. The rolling unit is disposed on the body. The light receiving device is disposed on the rolling unit, wherein the light receiving device and the rolling unit are integral.

In the present invention, the disc detection apparatus, body and the rolling unit are integrated such that the space arrangement in the optical disc drive is simplified, and the slot-in mechanism including body, rolling unit and disc detection apparatus can be a module.

A detailed description is given in the following embodiments with reference to the accompanying drawings.

DETAILED DESCRIPTION OF THE INVENTION

Figure 1:
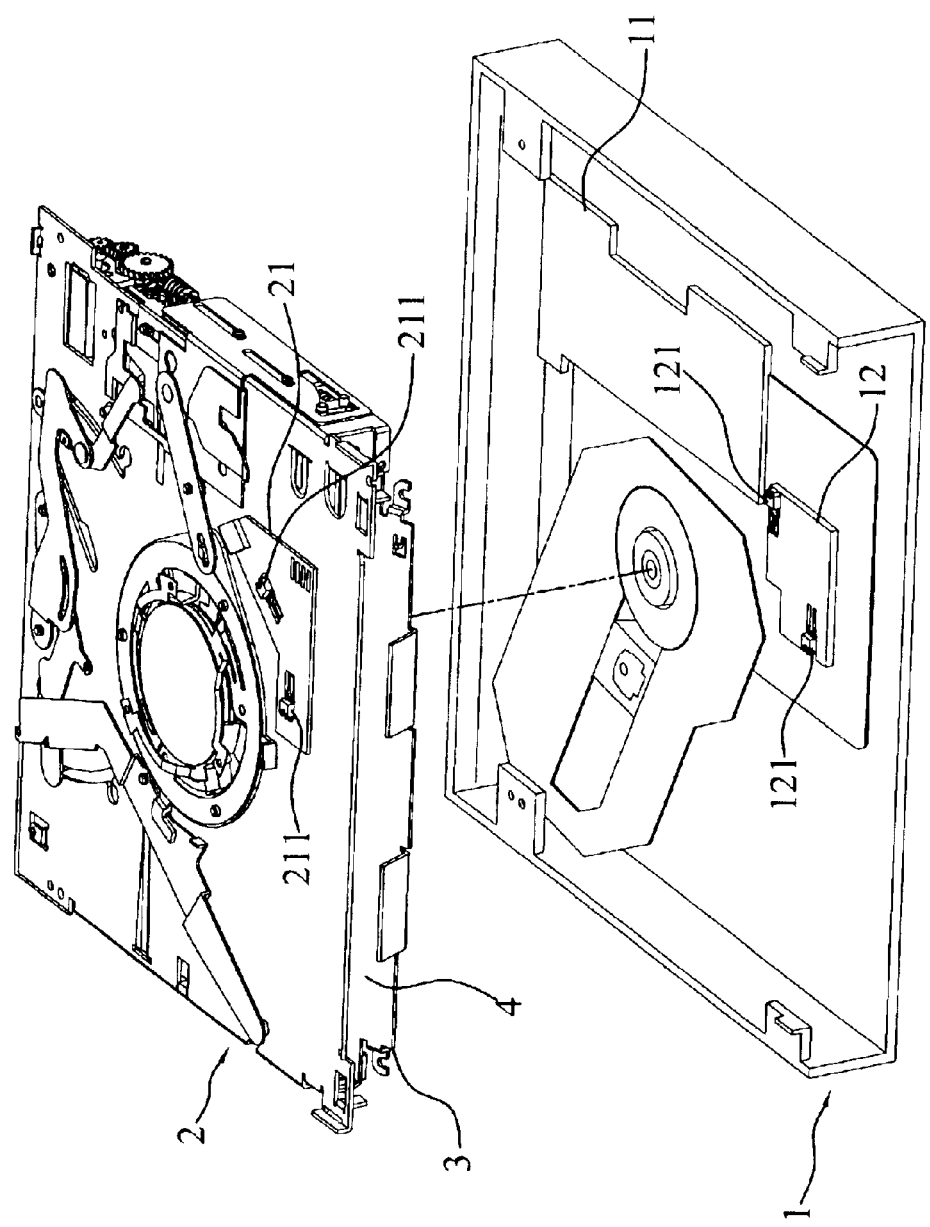
FIG. 1 is an exploded perspective diagram of a conventional optical disc drive, and the upper housing is detached from the drive.
Figure 2:
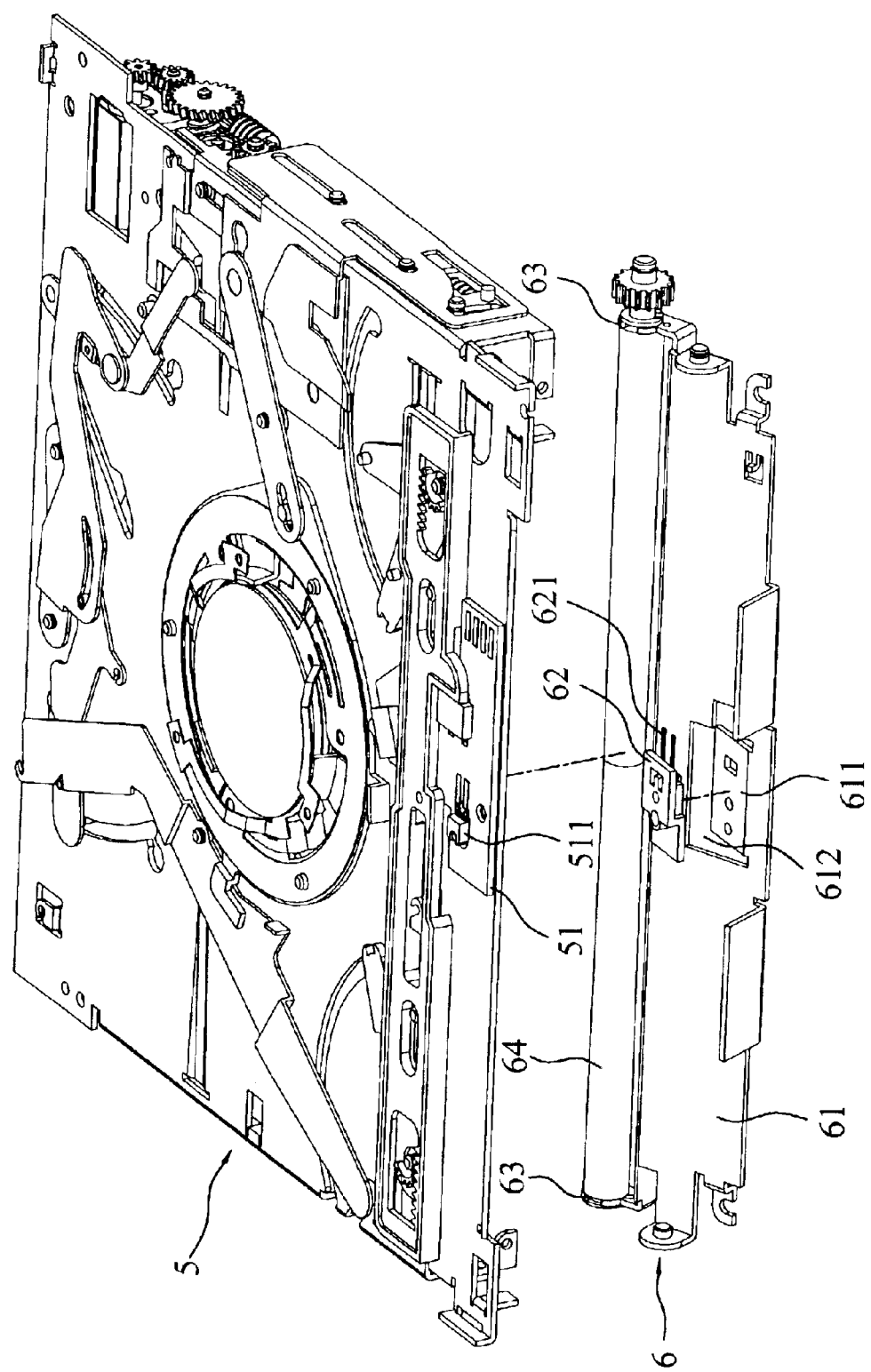
FIG. 2 is an exploded perspective diagram of an embodiment of the present invention.
Figure 3:
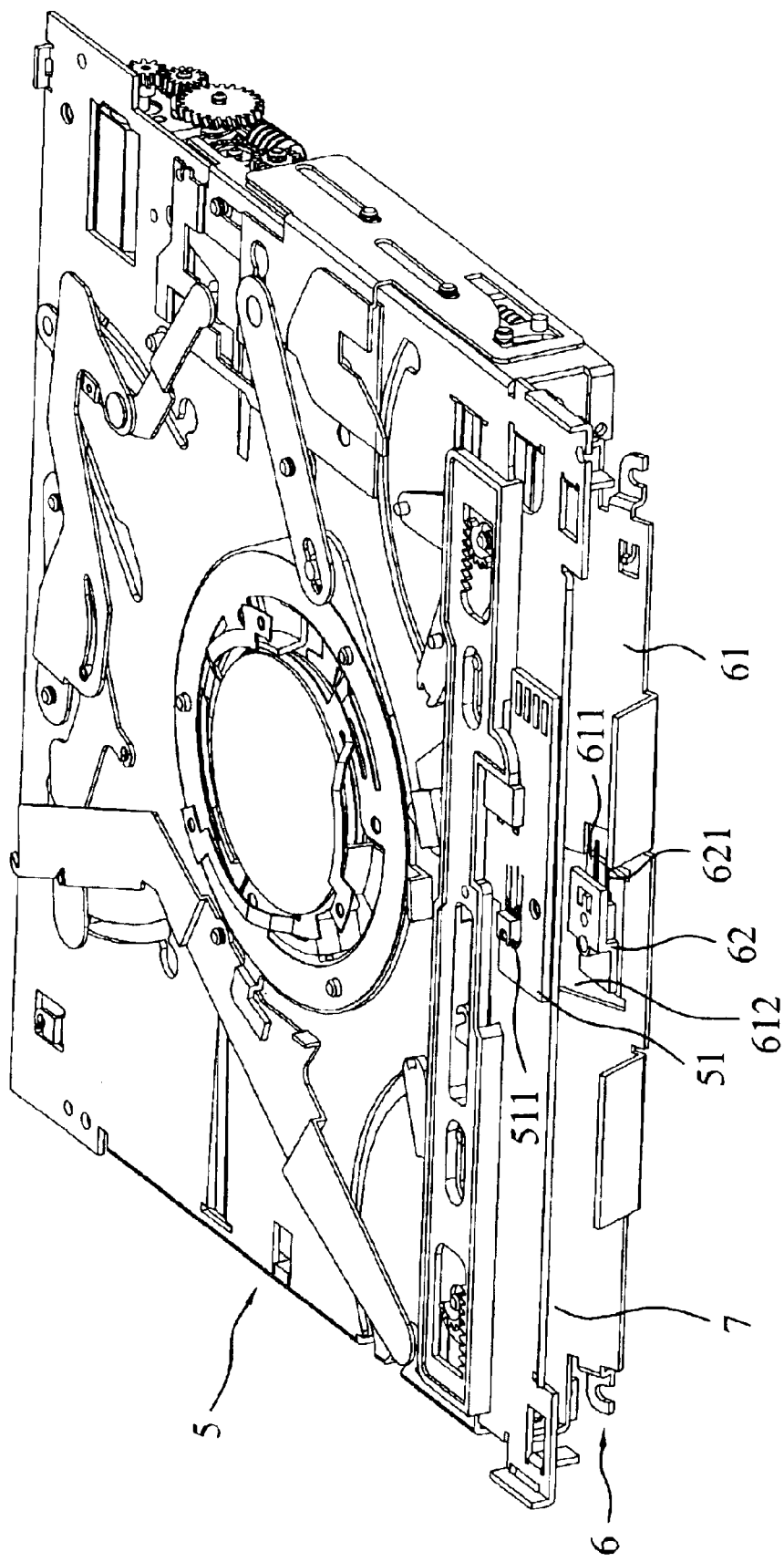
FIG. 3 is a schematic view of the embodiment.

As shown in FIGS. 2 and 3, the disc detection apparatus includes a body 5 and a rolling unit 6, wherein the upper and the lower housings are not shown.

Figure 6:
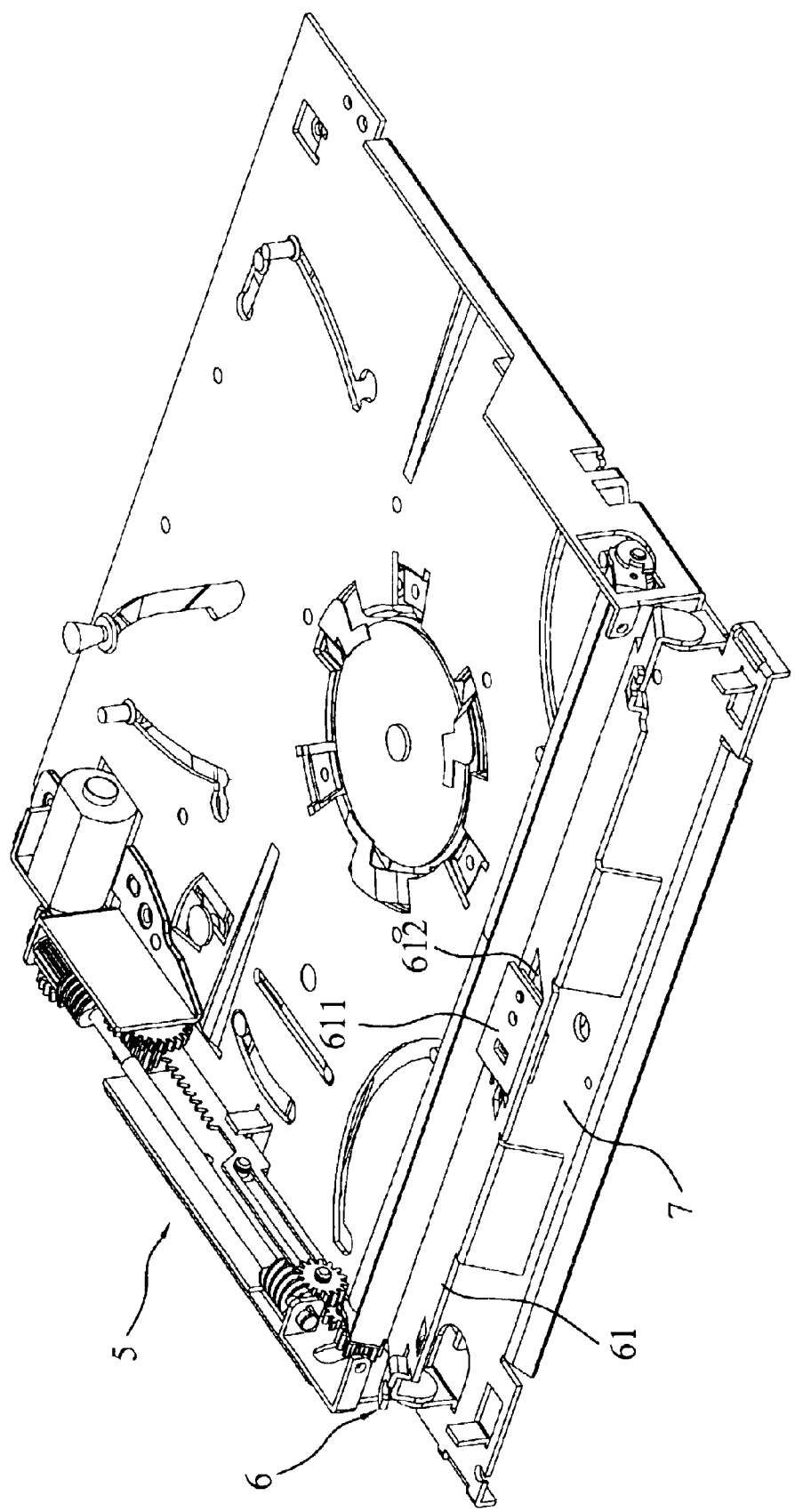
FIG. 6 is a bottom view of the embodiment.

As shown in FIGS. 2, 3 and 6, the rolling unit 6 is disposed on the front of the body 5, and a slot 7 is formed between the body 5 and the rolling unit 6.

Figure 4:
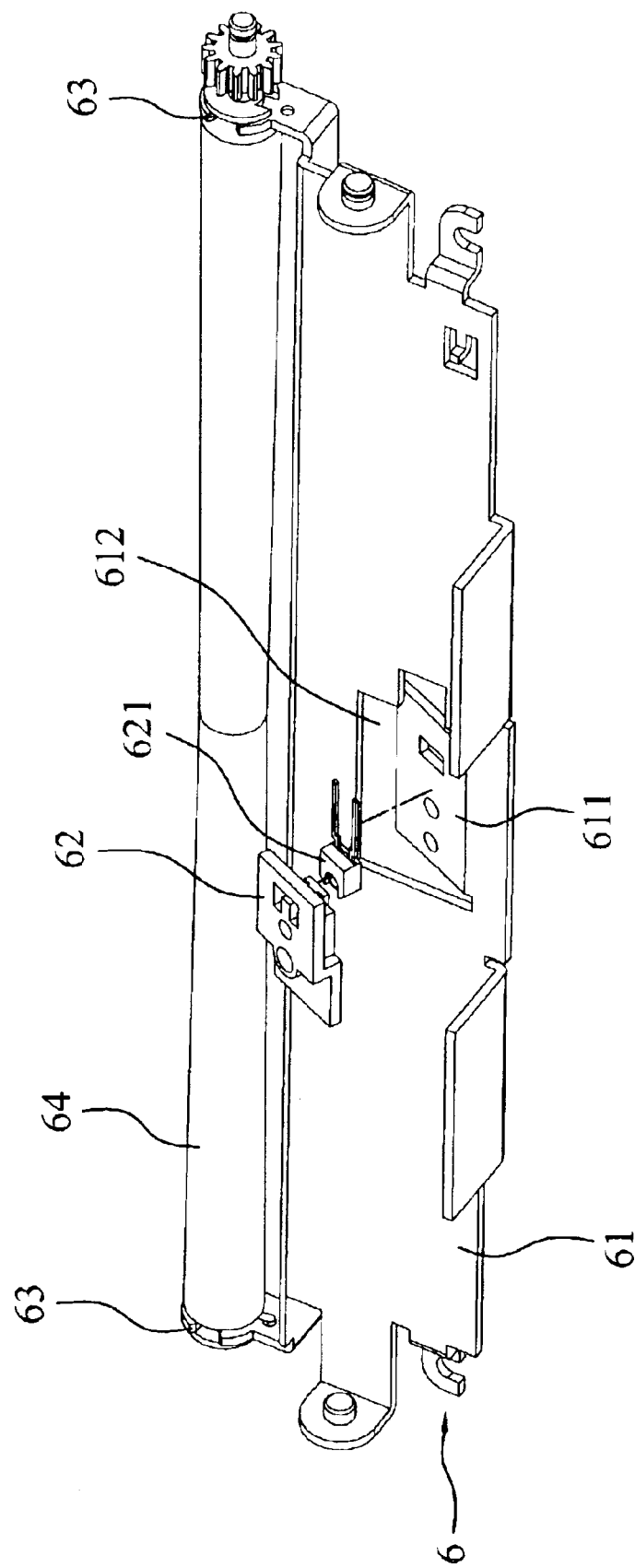
FIG. 4 is an exploded perspective diagram of the rolling unit of the embodiment.
Figure 5:
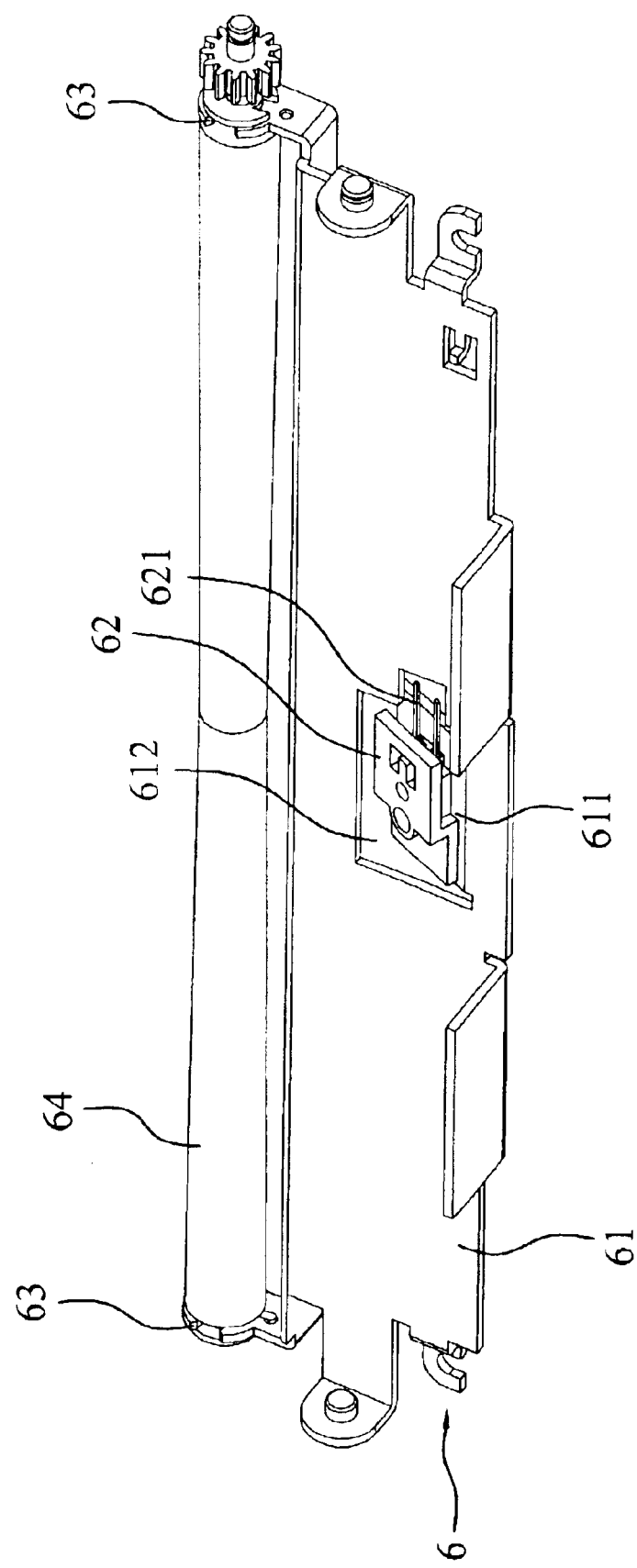
FIG. 5 is a schematic view of the rolling unit of the embodiment.

In FIGS. 4 and 5, the rolling unit 6 includes a frame 61 and a roller 64, wherein the frame 61 has two fixing portions 63 at two ends, and the roller 64 is disposed between the fixing portions 63.

In FIGS. 2 and 3, a circuit board 51 and a plate 62 are disposed between the body 5 and the rolling unit 6, wherein the circuit board 51 is mounted on the body 5, and the plate 62 is mounted on the rolling unit 6. A light emitting device 511 is disposed on the circuit board 51, and a light receiving device 621 is disposed on the plate 62. light is emitted from the light emitting device 511 and received by the light receiving device 621, and furthermore the light emitting device 511 and the light receiving device 621 are disposed on the upper and the lower sides of the slot 7 respectively.

The plate 62 having the light receiving device 621 can be mounted on the rolling unit 6 directly. In addition, the frame 61 of the rolling unit 6 can be punched to form an opening 612 and a holder 611, and the plate 62 can be also disposed on the holder 611. As shown in FIG. 2, an angled tongue of the holder 611 is connected to the side of the frame 61.

After the light is emitted, the light receiving device 621 outputs a signal to show whether the light is received. For example, the light receiving device 621 is electrically connected to the plate 62 (not shown in FIG.), wherein the plate 62 is a circuit board. In another embodiment, the light receiving device 621 is connected to another circuit board (not shown) using a signal line. The holder 611 is disposed on the plate 62 to fix the light receiving device 621, wherein the holder 611 is attached to the plate 62 using welding, engaging, or adhesion.

In FIGS. 3 and 6, when light is emitted from the light emitting device 511 and received by the light receiving device 621, the light receiving device 621 outputs a signal indicating that there is no disc between the light emitting device 511 and the light receiving device 621. When light is emitted from the light emitting device 511 but not received by the light receiving device 621, the light receiving device 621 outputs another signal indicating that light is obstructed by a disc. According to the signal from the light receiving device 621, the presence of the disc is confirmed, and the rotation of the rolling unit 6 is initiated and startup.

In particular, the disc detection apparatus described above is a modular apparatus, wherein the light emitting device 511 is mounted on the body 5, the light receiving device 621 is mounted on the rolling unit 6, and the rolling unit 6 is disposed on the body 5. As a result of the simplified and modular arrangement, the disc detection apparatus is integral, conserving considerable deployment space. When the body 5 is detached from the optical disc drive, the rolling unit 6 and the disc detection apparatus can be removed together with the body 5, without a connection with the lower housing by electric wires and signal lines.

In the present invention, the disc detection apparatus including the light emitting device 511, the light receiving device 621 and circuit board are disposed on the rolling unit 6 and the body 5. In particularly, the light receiving device 621 and the plate 62 are mounted on the rolling unit 6 such that the space arrangement in the optical disc drive is simplified. According to the present invention, the body 5, the rolling unit 6 and the disc detection apparatus are integrated into a module.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A disc detection apparatus for slot-in optical disc drive, comprising:

a body;

a light emitting device, disposed on the body;

a rolling unit, disposed on the body and configured draw an optical disc into the optical disc drive; and a light receiving device, disposed on the rolling unit, wherein the light receiving device and the rolling unit are integral.

2. The disc detection apparatus as claimed in claim 1, further comprising a circuit board, wherein the light emitting device is disposed on the circuit board and the circuit board is disposed on the body.

3. The disc detection apparatus as claimed in claim 1, further comprising a plate, wherein the light receiving device is disposed on the plate and the plate is disposed on the rolling unit.

4. The disc detection apparatus as claimed in claim 3, wherein the light receiving device is fixed on the rolling unit by the plate.

5. The disc detection apparatus as claimed in claim 3, wherein the plate is a circuit plate, and the light receiving device is electrically connected to the circuit plate.

6. The disc detection apparatus as claimed in claim 1, wherein the rolling unit comprises a frame and a roller thereon, the frame including a holder corresponding to the light emitting device, with the light receiving device fixed on the holder.

7. The disc detection apparatus as claimed in claim 6, wherein the frame has an opening, and the holder connects with a side of the frame.

8. The apparatus as claimed in claim 6, further comprising a circuit board, wherein the light emitting device is disposed on the circuit board and the circuit board is disposed on the body.

9. The apparatus as claimed in claim 6, further comprising a plate, wherein the light receiving device is disposed on the plate and the plate is disposed on the holder.

10. The apparatus as claimed in claim 9, wherein the light receiving device is fixed on the rolling unit by the plate.

11. The apparatus as claimed in claim 9, wherein the plate is a circuit plate, and the light receiving device is electrically connected with the circuit plate.

* * * * *